(12) United States Patent
Berkebile et al.

(10) Patent No.: US 8,904,635 B2
(45) Date of Patent: Dec. 9, 2014

(54) METHOD FOR SERVICING A TURBINE PART

(75) Inventors: Matthew Paul Berkebile, Mauldin, SC (US); Srikanth Chandrudu Kottilingam, Simpsonville, SC (US); Gene Arthur Murphy, Jr., Schoharie, NY (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 12/939,679

(22) Filed: Nov. 4, 2010

(65) Prior Publication Data

US 2012/0110847 A1 May 10, 2012

(51) Int. Cl.
| | |
|---|---|
| *B23K 26/00* | (2014.01) |
| *B23P 6/04* | (2006.01) |
| *B23K 1/005* | (2006.01) |
| *B23K 26/34* | (2014.01) |
| *F01D 5/00* | (2006.01) |
| *B23K 26/32* | (2014.01) |

(52) U.S. Cl.
CPC .............. *B23P 6/045* (2013.01); *B23K 1/0056* (2013.01); *B23K 26/34* (2013.01); *F01D 5/005* (2013.01); *B23K 23/3206* (2013.01); *B23K 26/3293* (2013.01); *B23P 2700/13* (2013.01); *F05D 2230/234* (2013.01); *F05D 2230/80* (2013.01); *F05D 2260/201* (2013.01); *F05D 2260/202* (2013.01); *F23R 2900/00019* (2013.01)
USPC .................. 29/889.1; 29/402.01; 219/121.61; 219/121.64

(58) Field of Classification Search
CPC .............. B23P 6/007; B23P 6/00; B23P 6/04; B23P 6/045; B23P 2700/01; B64F 5/0081; B23K 26/063; B23K 26/0635; B23K 26/123; B23K 26/206; B23K 2203/04; B23K 2203/14; B23K 26/32; B23K 26/20; B23K 26/34; B23K 2201/001; F01D 5/005
USPC .................. 29/889.1, 402.01, 402.09, 402.11, 29/402.13, 402.18; 219/121.61, 121.62, 219/121.63, 121.64, 121.66
See application file for complete search history.

(56) References Cited

U.S. PATENT DOCUMENTS

| | | | | |
|---|---|---|---|---|
| 5,624,585 | A * | 4/1997 | Haruta et al. ............ | 219/121.63 |
| 7,146,725 | B2 * | 12/2006 | Kottilingam et al. ........ | 29/889.1 |
| 7,587,818 | B2 * | 9/2009 | Gorman et al. ............. | 29/889.1 |
| 8,022,330 | B2 * | 9/2011 | Emiljanow ............... | 219/121.64 |
| 2005/0092725 | A1 * | 5/2005 | Byrd ........................ | 219/121.85 |
| 2011/0049112 | A1 * | 3/2011 | Johnson et al. .......... | 219/121.64 |
| 2011/0168679 | A1 * | 7/2011 | Qi et al. ........................ | 219/75 |

* cited by examiner

*Primary Examiner* — David Bryant
*Assistant Examiner* — Jun Yoo
(74) *Attorney, Agent, or Firm* — Cantor Colburn LLP

(57) ABSTRACT

According to one aspect of the invention, a method for in situ repair of a turbine part is provided. The method includes the steps of accessing the turbine part while assembled to other turbine components, wherein the turbine part includes a region with a structural flaw near a hole in the turbine part, and wherein the hole is configured to flow a cooling fluid. The method also includes welding the structural flaw without performing a heat treatment of the turbine part, wherein welding the structural flaw includes laser welding that maintains a structure of the region.

19 Claims, 3 Drawing Sheets

METHOD FOR SERVICING A TURBINE PART

BACKGROUND OF THE INVENTION

The subject matter disclosed herein relates to turbines. More particularly, the subject matter relates to repair of gas turbine parts.

In a gas turbine engine, a compressor provides pressurized air to one or more combustors wherein the air is mixed with fuel and burned to generate hot combustion gas. These gases flow downstream to one or more turbines that extract energy therefrom to produce a mechanical energy output as well as power to drive the compressor. Over time, turbine parts, such as parts of the combustor, may experience fatigue, due to extreme conditions within the turbine, including high temperatures caused by combustion. In particular, combustor parts may include cooling holes configured to flow a cooling fluid into the combustor. The areas near cooling holes are exposed to a significant temperature difference between adjacent regions exposed to hot gases and cool cooling fluid. This may cause deformities, such as cracks, in the fatigued areas. Repair of turbine parts with cooling holes can be difficult and time consuming. Specifically, the turbine part may have to be removed and disassembled from adjacent parts, holes therein for cooling fluid filled in and then the part machined to regain the ability to flow fluid. Further, in cases where the region with cracks includes a thermal barrier coating, the coating may be damaged during repair.

BRIEF DESCRIPTION OF THE INVENTION

According to one aspect of the invention, a method for in situ repair of a turbine part is provided. The method includes the steps of accessing the turbine part while assembled to other turbine components, wherein the turbine part includes a region with a structural flaw near a hole in the turbine part, wherein the hole is configured to flow a cooling fluid and welding the structural flaw without performing a heat treatment of the turbine part, wherein welding the structural flaw includes laser welding that maintains a structure of the region.

According to another aspect of the invention, a method for repairing a combustion part of a turbine is provided. The method includes the steps of accessing the combustion part in situ, wherein the combustion part includes a crack formed near a hole with a diameter to enable a flow of cooling fluid and filling the crack without substantially changing the diameter of the hole, thereby enabling the flow of cooling fluid after the crack is filled.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
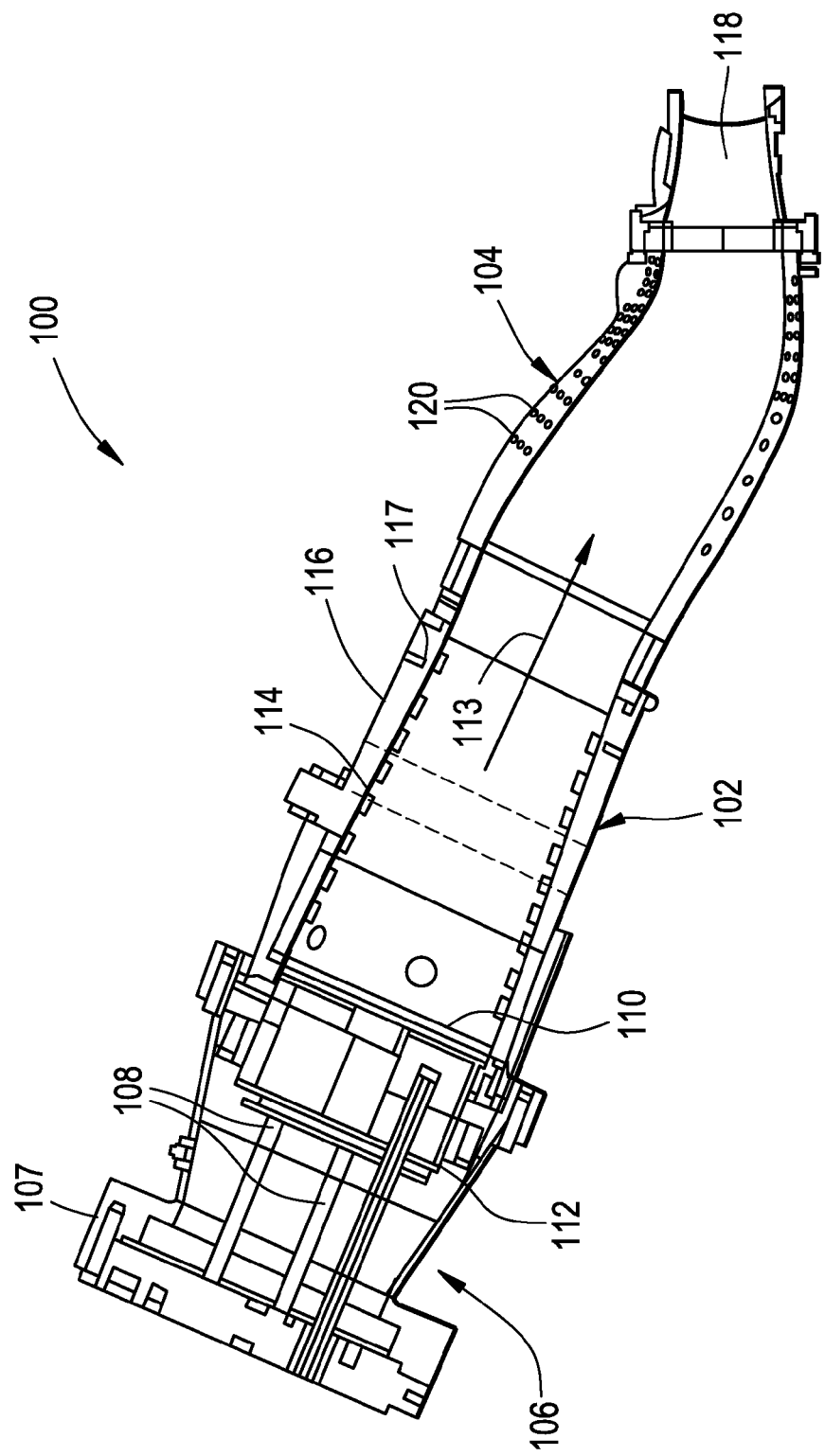
FIG. 1 is a sectional side view of an embodiment of gas turbine combustor.

FIG. 1 is a sectional side view of an embodiment of gas turbine combustor 100. The combustor 100 includes a combustion chamber 102, transition piece 104 and fuel nozzle assembly 106. The fuel nozzle assembly 106 includes an end cover 107, fuel nozzles 108, effusion plate 110 and combustion cap 112. The fuel nozzles 108 inject and mix a supply of fuel and a supply of compressed air into the combustion chamber 102, wherein the fuel-air mixture combusts to provide a hot gas flow downstream 113. The combustion chamber 102 includes a liner 114 positioned within a flow sleeve 116, wherein an air supply is directed through flow holes 117 in the liner 114 to provide air to the combustion chamber 102. The hot gas flows downstream 113 from combustion chamber through transition piece 104 to turbine 118. The transition piece 104 includes holes 120 configured to flow a cooling fluid, thereby cooling the transition piece 104.

Figure 2:
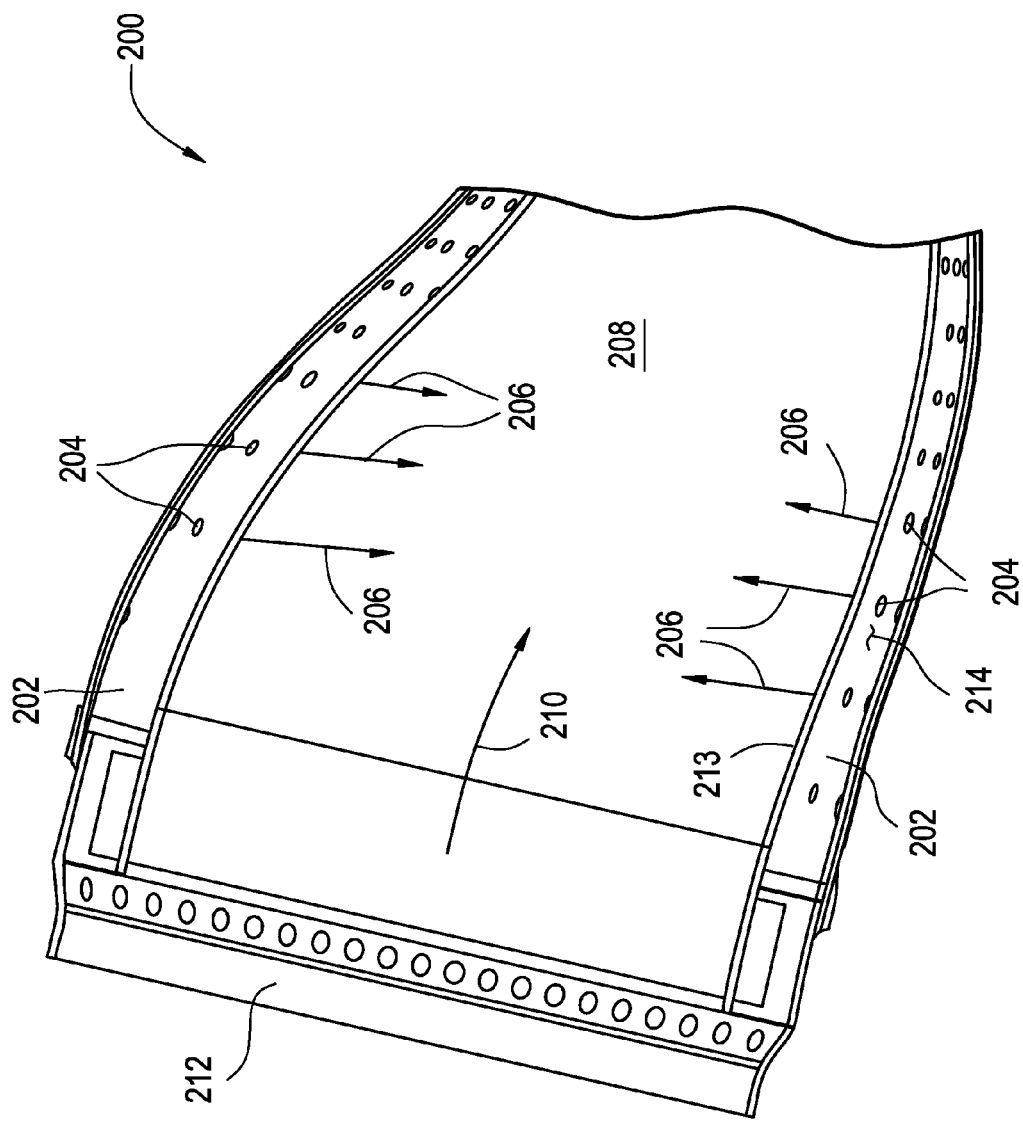
FIG. 2 is a sectional side view of an embodiment of a transition piece.

Referring now to FIG. 2, a sectional side view of an embodiment of a transition piece 200 is illustrated. The transition piece 200 includes a body 202 with holes 204 for flow of a cooling fluid 206 into a chamber 208. The cooling fluid 206 is configured cool the body 202 as a hot gas flow 210 flows into the chamber 208 from a combustor coupled to transition piece end 212. The holes 204 are a suitable structure or geometry, such as circles, hexagons or squares, to provide cooling fluid flow 206 that creates a film on body 202 to protect the body 202 as the hot gas 210 flows through the transition piece 200. The shape and size of the holes 204 are designed to improve cooling of the body 202 (also referred to as impingement sleeve). In an embodiment, the holes 204 are a circular structure with a diameter of about 0.5 to 3 millimeters, wherein the size and shape of the structure causes the cooling fluid 206 to diffuse in the chamber 208. In an embodiment, the body 202 comprises a steel alloy and the holes 204 are punched, drilled or otherwise formed in the body 202. The pulsed laser weld repair near the holes 204 does not substantially change the diameter of the holes 204, thereby enabling the cooling fluid to flow and produce the desired cooling in the turbine part, such as transition piece 200.

In addition, an exemplary transition piece 200 includes a thermal barrier coating 213 wherein the thermal barrier coating 213 is configured to provide a layer of protection to the transition piece 200 from the high temperatures caused by hot gas flow 210 within the transition piece 200. Further, thermal barrier coating 213 is disposed on a surface of the transition piece 200 wherein the thermal barrier coating 213 comprises a metal substrate, metallic bond coat, thermally grown oxide and ceramic topcoat. In embodiments, a structural flaw, such as a crack 214, may develop near holes 204. A pulsed laser welder may be used to fill the crack by precisely melting a filler material and the body 202 near the crack, wherein the pulsed laser weld repairs the crack 214 without affecting the nearby holes 204 and while maintaining the thermal barrier coating 213. This is due to the precision and short pulse width of pulsed laser weld focused on the small area of the crack 214. Thus, by intensely focusing short pulse width laser beams of the pulsed laser welder in a selected area, the pulsed laser welder provides a lower heat to the region of the body 202 near the crack 214, thereby protecting the holes 204 and thermal barrier coating 213. By precisely filling the crack 214 using the pulsed laser welder, the repair of the transition piece 200 is simplified and shortened due to the weld not affecting the structure of holes 204 and thermal barrier coating 213.

As discussed herein, methods for servicing, repairing or reconditioning turbine parts are provided. The methods enable welding parts to repair structural flaws in the parts. The structural flaws may be cracks or other deformities caused by thermal fatigue, mechanical fatigue and other wear over time. Further, the structural flaws are repaired while the part is assembled to adjacent turbine parts. In addition, in one aspect, the pulsed laser weld repair process does not include heat treatment or other steps used in other flaw repair processes. Thus, the repair is performed in situ and by a highly accurate pulsed laser welder, thereby reducing the number of steps for repair, reducing downtime and saving money. In other embodiments, filling a crack near a cooling fluid hole may involve the steps of heat treating the region near the crack, brazing the region. The process of brazing can fill nearby holes, where the filled holes are machined or drilled to re-open the hole for cooling fluid flow. As discussed herein, in situ repair or service means the part is removed from the turbine but is not disassembled or partially disassembled, meaning the part remains coupled to adjacent turbine parts during repair to simplify the repair process.

In one embodiment, a flaw in a turbine part, such as a crack in a combustion part, is repaired by pulsed laser welding. In an example, the pulsed laser welding process is a very low heat input process where a laser beam (e.g., yttrium aluminium garnet or "YAG" laser) is used to provide the energy for melting the material near the flaw. In embodiments, a filler material is also heated by the laser and used to fill the flaw. Exemplary filler materials include H230, Nimonic 263, Hastelloy X, Hastelloy W, H282, H188, and other similar solid solution strengthened and low volume gamma prime strengthened superalloys. In an embodiment, the mean power used by the welder is in the range of 20 W to 200 W. In another embodiment, the mean power used by the welder is in the range of 10 W to 400 W. In yet another embodiment, the mean power used by the welder is in the range of 50 W to 150 W. Although the mean power is relatively low, the peak pulse of the laser can be relatively high. The peak power may range into several kilowatts (KW). For example, the peak pulse of the laser ranges from about 600 Watts to 10 Kilowatts. Thus, an exemplary pulsed laser welder uses a peak power of about 40 times the mean power of the welder. In another embodiment, the peak pulse of the laser ranges from about 800 Watts to 8 Kilowatts. In addition, in an embodiment, the pulse time or pulse width of the pulsed laser is very small which causes a small volume of the material to melt, thereby preserving or maintaining the structure of the region near that being repaired. For example, a pulse width may be in the range of about 1 to about 10 milliseconds. In another embodiment, a pulse width may be in the range of about 2 to about 5 milliseconds. Further, one exemplary pulse frequency determines the number of pulses per second and ranges from about 1 to about 25 Hertz. In another embodiment, the pulse frequency of the laser ranges from about 3 to about 15 Hertz. In yet another embodiment, the pulse frequency of the laser ranges from about 5 to about 10 Hertz. Exemplary pulsed laser welders are used to repair cracks in turbine parts using high power peak pulses for very small pulse widths to cause a very small weld pool to develop on and near the surface to be repaired. The effect of the corresponding heat input on the part material being repaired is small, thereby reducing or eliminating changes to the structure near the welded portion. Accordingly, a repair method or process using the laser welder reduces the complexity, time and cost for repair of turbine parts.

Figure 3:
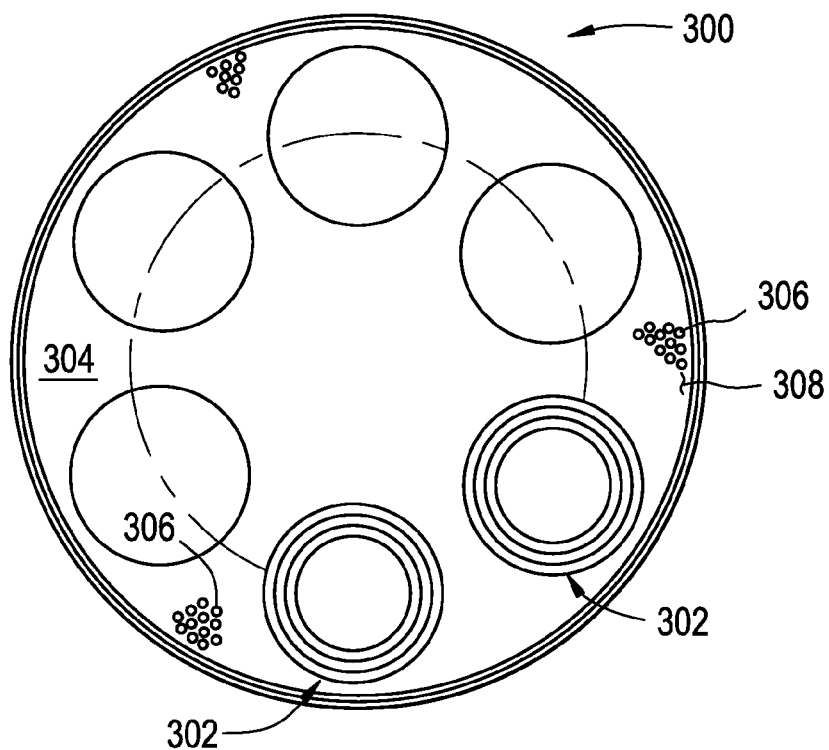
FIG. 3 is a top view of an embodiment of an effusion plate.

FIG. 3 is a top view of an embodiment of an effusion plate 300. In one embodiment, the effusion plate 300 is proximate to a downstream end of one or more fuel nozzles 302. The effusion plate 300 includes a body 304 with a plurality of holes 306 for a flow of cooling fluid. In an aspect, the holes 306 are circular holes configured to enable a fluid flow through the holes 306 and causing a film of cooling fluid to develop on the body 304, thereby cooling the body from the hot gas flow within the turbine. In aspects, the holes 306 may be any suitable structure, including but not limited to, circles, hexagons and squares. Over time, wear and tear may cause flaws, such as a crack 308, to develop on the body 304 near the holes 306. As discussed above, the crack 308 is repaired by a pulsed laser welder without affecting the structure of the holes. In an example, the effusion plate 300 is removed from the turbine and the crack 308 is pulsed laser welded while still attached to adjacent components, such as nozzles 302, thereby eliminating disassembly and assembly steps of the repair process. The pulsed laser weld provides a precise and focused weld to fill the crack 308 without affecting regions near the weld. Specifically, the precise laser weld of the crack 308 does not affect a structure of the cooling fluid holes 306 and is performed while attached to fuel nozzles 302. Thus, the crack 308 is repaired and operational without brazing or machining the body 304 or the holes 306 following the pulsed laser welding process. Accordingly, the repair process is simplified and shortened by utilizing pulsed laser welding to avoid several steps that are used in other repair processes.

Figure 4:
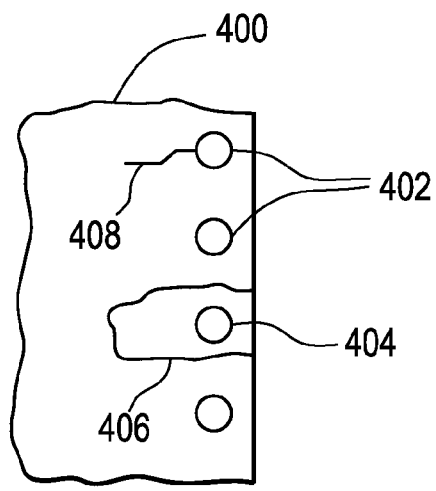
FIG. 4 is a top view of an embodiment of a combustion part that has been repaired.

FIG. 4 is a top view of an embodiment of a combustion part 400 that has been repaired using a pulsed laser welder. The combustion part 400 includes holes 402, repaired hole 404, weld area 406 and crack 408. The repaired hole 404 shows the structure of the hole 404 that has been maintained after a pulsed laser weld has repaired a crack filled by the weld area 406. The depicted weld area 406 shows the area after pulsed laser welding, where the weld forms a small pool, but does not fill hole 404. Therefore, the hole 404 is capable of fluid flow without machining or drilling the hole before reinstalling in the turbine. Element 408 depicts an example of a crack that may be repaired by the pulsed laser welding method discussed above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for in situ repair of a turbine part, the method comprising:
   accessing the turbine part while assembled to other turbine components, wherein the turbine part comprises a region with a structural flaw originating at a hole in the turbine part, wherein the hole is configured to flow a cooling fluid; and
   pulsed laser welding the structural flaw entirely circumferentially about the hole without performing a heat treatment of the turbine part and without substantially changing a diameter of the hole and a thermal barrier coating on the turbine part, wherein welding the structural flaw comprises laser welding that maintains a structure of the region.

2. The method of claim 1, wherein the structural flaw is a crack.

3. The method of claim 2, wherein pulsed laser welding comprises welding using a peak power of about 40 times a mean power usage ranging from about 10 Watts to about 400 Watts.

4. The method of claim 1, wherein accessing the turbine part comprises accessing one selected from the group consisting of: a transition piece, a combustion cap, or a liner.

5. The method of claim 1, wherein laser welding comprises pulsed laser welding with a pulse width of about 1 to 5 milliseconds.

6. The method of claim 1, wherein laser welding comprises pulsed laser welding without substantially changing a structure of the hole to enable the flow of cooling fluid after welding.

7. The method of claim 1, wherein laser welding comprises pulsed laser welding with a filler material.

8. The method of claim 1, wherein laser welding comprises pulsed laser welding at a pulse frequency of about 1 to about 25 Hertz.

9. A method for repairing a combustion part of a turbine, the method comprising:
   accessing the combustion part in situ, wherein the combustion part comprises a crack originating at a hole with a diameter to enable a flow of cooling fluid; and
   pulsed laser welding the crack entirely circumferentially about the hole while maintaining a thermal barrier coating near the crack and without substantially changing the diameter of the hole thereby enabling the flow of cooling fluid after the crack is welded.

10. The method of claim 9, wherein welding the crack comprises pulsed laser welding the crack without brazing.

11. The method of claim 10, wherein pulsed laser welding comprises pulsed laser welding with a peak power of the laser that is about 40 times a mean power of the laser ranging from about 10 Watts to about 400 Watts.

12. The method of claim 11, wherein the peak power comprises about 600 Watts to about 10 Kilowatts.

13. The method of claim 9, wherein welding the crack comprises pulsed laser welding the crack without performing a heat treatment of the turbine part.

14. The method of claim 9, wherein welding the crack comprises welding the crack propagating from the hole.

15. A method for servicing a turbine part, the method comprising:
   accessing the turbine part in situ, wherein the turbine part comprises a crack originating at least one hole with a structure to enable a flow of cooling fluid; and
   pulsed laser welding the crack entirely circumferentially about the at least one hole while maintaining a thermal barrier coating near the crack and wherein the pulsed laser welding comprises repairing the crack without affecting the structure of the at least one hole, thereby enabling the flow of cooling fluid.

16. The method of claim 15, wherein pulsed laser welding comprises pulsed laser welding with a pulse frequency of about 1 to about 25 Hertz.

17. The method of claim 15, wherein pulsed laser welding comprises welding at a peak power of about 600 Watts to about 10 Kilowatts.

18. The method of claim 15, wherein accessing the turbine part comprises accessing one selected from the group consisting of: a transition piece, a combustion cap, or a liner.

19. The method of claim 15, wherein the turbine part is operational and service is complete after the pulsed laser welding step.

* * * * *